United States Patent
Merchant et al.

(10) Patent No.: US 6,319,095 B1
(45) Date of Patent: Nov. 20, 2001

(54) COLLOIDAL SUSPENSION OF ABRASIVE PARTICLES CONTAINING MAGNESIUM AS CMP SLURRY

(75) Inventors: Sailesh Mansinh Merchant; Sudhanshu Misra; Pradip Kumar Roy, all of Orlando, FL (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/521,768

(22) Filed: Mar. 9, 2000

(51) Int. Cl.[7] .................................................. B24B 1/00
(52) U.S. Cl. ................... 451/36; 451/41; 451/54
(58) Field of Search ................... 134/7; 51/309; 451/36, 41, 54, 60, 63; 216/692, 693

(56) References Cited

U.S. PATENT DOCUMENTS

| | | | |
|---|---|---|---|
| 3,877,183 | * 4/1975 | Deckert et al. | |
| 5,320,706 | 6/1994 | Blackwell | 156/636 |
| 5,593,339 | * 1/1997 | Yam et al. | 451/36 |
| 5,605,491 | * 2/1997 | Yam et al. | 451/40 |
| 5,896,870 | 4/1999 | Huynh et al. | 134/1.3 |
| 5,913,712 | 6/1999 | Molinar | 451/41 |
| 6,007,639 | * 12/1999 | Logan, Jr. | 134/7 |

* cited by examiner

*Primary Examiner*—Timothy V. Eley
(74) *Attorney, Agent, or Firm*—Schnader Harrison Segal & Lewis LLP

(57) ABSTRACT

An improved colloidal slurry for chemical mechanical polishing and methods of polishing using the improved colloidal slurry.

15 Claims, 1 Drawing Sheet

COLLOIDAL SUSPENSION OF ABRASIVE PARTICLES CONTAINING MAGNESIUM AS CMP SLURRY

BACKGROUND OF THE INVENTION

1. Field of the Invention

This invention relates to the field of semiconductor integrated circuits. The invention relates more particularly to an improved colloidal slurry for chemical mechanical polishing and methods of polishing using the improved colloidal slurry.

2. Background of the Invention

Semiconductor integrated circuits typically comprise a substrate such as silicon and multiple layers of vertically stacked metal interconnect layers with dielectric materials disposed between them. The fabrication of such devices typically involves the repeated deposition or growth, patterning, and etching of thin films of semiconductor, metal, and dielectric materials.

During the manufacturing process, removal of certain layers or portions must be achieved to pattern and form various components and interconnects. One of the techniques available for removal of material from a semiconductor wafer is known as chemical mechanical polishing (CMP), which provides a smooth, specular surface on which device features can be defined. It is desirable to produce a surface with a high degree of surface flatness and minimum local slope, which is free from contamination and damage. "Polishing" as used herein means polishing and/or planarizing.

A typical apparatus used in chemical mechanical polishing is shown in the drawing. The drawing illustrates a polishing pad 1 made of artificial fiber affixed to a polishing plate 2. Wafers 3 are mounted on a fixture, or wafer holder 4, which rotates around a shaft 5 relative to pad 1 and is pressured against pad 1. Alternatively, the polishing plate may rotate and the wafer holder may be horizontally fixed. A mixture 6 of polishing slurry is dripped onto pad 1. The slurry initiates the polishing process by chemically reacting with a material to be polished. For example, when polishing a silicon surface with a colloidal slurry containing $SiO_2$ particles in an aqueous solution of sodium or potassium hydroxide, under heat of friction, the sodium or potassium hydroxide oxidizes the silicon with an $OH^-$ radical. In a mechanical step, the silica particles in the colloidal slurry abrade the oxidized silicon and may also abrade non-oxidized silicon. Polishing rate and surface finish are complex functions of pressure, pad properties, rotation speed, slurry composition, pH, and type of material being polished.

Slurry composition is an important factor in providing a manufacturable chemical mechanical polishing process. Conventional polishing compositions, or slurries, generally consist of a solution that contains abrasive particles. These colloidal slurries are often used in the chemical mechanical polishing of metals, where polishing may be used to define vertical and horizontal wiring in the wafer and insulator or dielectric materials. Typically, these colloidal slurries contain alumina, silica, or ceria, which are slightly soluble in alkalies and acids. Silicon dioxide abrasives are more commonly used to polish dielectric layers, rather than metals. When silica particles are used in chemical mechanical polishing of a metal layer formed on a dielectric layer, such as $SiO_2$, undesirable amounts of the dielectric layer will be polished away with the metal.

Alumina-based aqueous slurries are more often used for chemical mechanical polishing of the surface of an object containing metal. Alumina particles have lower chemical reactivity and higher selectivity than silica particles on the dielectric layer, so undesirable amounts of the dielectric layer will not be polished away. The solids portion of the colloidal slurry contains 1 to 50 percent by weight of submicron alpha-alumina with the remainder of the solids portion being either aluminum hydroxide, gamma-alumina, delta-alumina, amorphous alumina, or amorphous silica.

The problem with using alumina, or aluminum oxide, abrasive particles in the colloidal slurry is that they tend to scratch the surface, creating metal filaments. When the next layer of metal deposited on the surface fills the scratches and interconnections are formed, the resulting metal filaments remaining can cause a short circuit fault to occur if the scratch is proximate to contacts or interconnection lines in the metal layer.

Less abrasive forms of aluminum oxide have been used, such as Boehmite, but they have very little polishing activity toward TiN and Ti bond layers, commonly employed to ensure adhesion of the contacting metal. This results in a relatively long polishing time for adequate removal of the bond layer, or an additional polishing step may be needed.

The benefit of using ceria-based slurry, or a slurry containing cerium oxide, is that the polishing rate is faster than aluminum based slurries. However, the ceria-based slurry provides poor planarity of the processed surface and an unacceptable level of metal impurities.

After chemical mechanical polishing, the residual slurry and particles are removed to complete planarization. Removal of residual polishing slurry is necessary to prevent problems in successive processing steps. Removal of the residual polishing slurry must be accomplished in a way that does not damage a wafer.

Particle removal may involve either a mechanical clean after the wafer has been removed from the chemical mechanical polishing process and dried or a washing step with a surfactant performed before the wafer is dried. For example, a method is known to remove slurry particles remaining on a wafer after chemical mechanized polishing by polishing the wafer with a polishing pad and applying a mixture of deionized water and a surfactant to the wafer and pad.

Another method is known that reduces scratches on a polished surface by using a multiple step process. A relatively hard polishing pad is first used to planarize, or polish, a wafer surface, using a chemically reactive and abrasive slurry. A relatively soft polishing pad is then used with a colloidal slurry to remove or reduce scratches introduced by polishing with the hard pad. Finally, the soft polishing pad is used with deionized water to remove particles from the surface of the wafer. In this known method, scratches are formed in the first step and may not all be removed by the subsequent steps. In addition, when using conventional colloidal slurries with alumina, silica, or cerium, the polishing pads may require conditioning after the chemical mechanical polishing because a glaze from the colloidal slurry mixture may be formed on the pads.

Pad conditioning may be performed by grounding the pad, at its surface, using a diamond wheel to remove glaze and residual wafer material. Diamond grains may separate from the wheel during this process and remain on the pad to cause scratches on the surface of a wafer that is polished after the grounding. The wafer may also be contaminated by metal grains from the wheel or a bonding material interposed between the wheel and the diamond. A substantial amount of pad material may also be removed in this process, shortening the life of the pad. These problems may cause an increase in pad replacement costs and may require additional process time to condition the pad between chemical mechanical polishing processes.

Therefore, a slurry composition used in chemical mechanical polishing that is easily removed from a polishing pad surface after polishing and results in less scratching and defects on the surface is desired. A method to remove residual abrasives after chemical mechanical polishing that does not require pad conditioning is also desired.

SUMMARY OF THE INVENTION

One aspect of the invention is a method of polishing a surface of an integrated circuit including the steps of: (1) applying a colloidal slurry, having abrasive particles containing a magnesium compound, to the surface; (2) polishing the surface with a polishing implement; and (3) rinsing the surface with a solution that reacts with the magnesium compound to form a water soluble salt to remove the colloidal slurry and particles generated from the polishing.

Another aspect of the invention is a method of polishing a surface of an integrated circuit including the steps of: (1) applying a colloidal slurry, having abrasive particles containing a magnesium compound, to the surface; (2) polishing the surface with a polishing implement; (3) rinsing the surface with a solution that reacts with the magnesium compound to form a water soluble salt to remove the colloidal slurry and particles generated from the polishing; and (4) rinsing the polishing implement with the solution to remove particles remaining on the polishing implement.

Yet another aspect of the invention is a colloidal slurry containing water and an amount of magnesium compound abrasive particles effective for chemical mechanical polishing a material on an integrated circuit.

BRIEF DESCRIPTION OF THE DRAWING

The drawing is a schematic view of a chemical-mechanical polishing apparatus.

DETAILED DESCRIPTION

Figure 1:
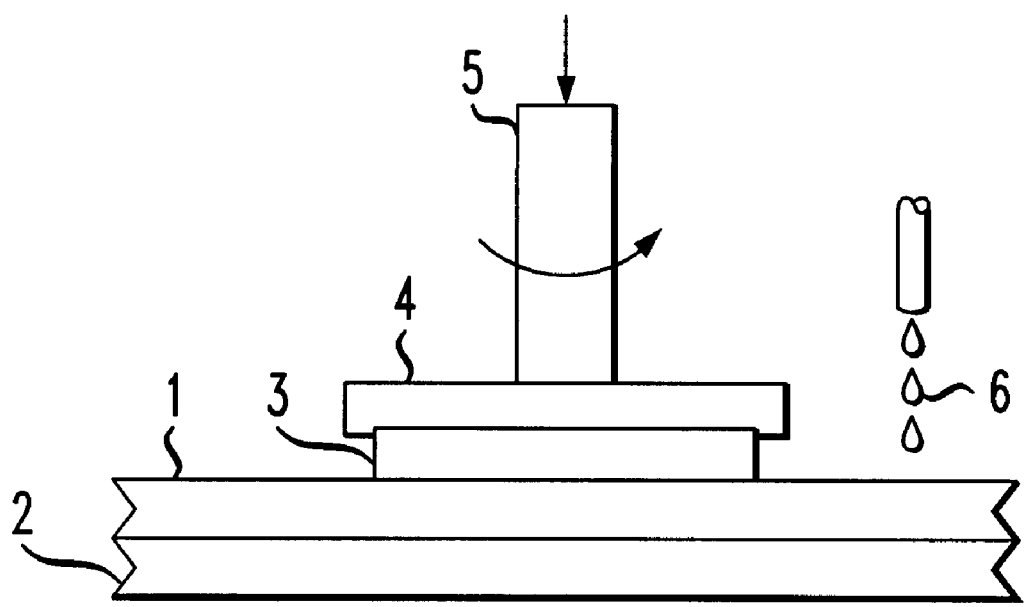

The invention will be understood more fully from the detailed description given below, which however, should not be taken to limit the invention to a specific embodiment, but is for explanation and understanding only.

A first method of the invention is a method of polishing a surface of an integrated circuit including the steps of: (1) applying a colloidal slurry, having abrasive particles containing a magnesium compound, to the surface; (2) polishing the surface with a polishing implement; and (3) rinsing the surface with a solution that reacts with the magnesium compound to form a water soluble salt to remove the colloidal slurry and particles generated from the polishing.

A second method of the invention is a method of polishing a surface of an integrated circuit including the steps of: (1) applying a colloidal slurry, having abrasive particles containing a magnesium compound, to the surface; (2) polishing the surface with a polishing implement; (3) rinsing the surface with a solution that reacts with the magnesium compound to form a water soluble salt to remove the colloidal slurry and particles generated from the polishing; and (4) rinsing the polishing implement with the solution to remove particles remaining on the polishing implement.

The preferred colloidal slurry used in the first and second methods of the invention is a colloidal slurry containing water and an amount of MgO and/or $Mg_2(OH)_2CO_3$ particles, effective for chemical mechanical polishing a material on an integrated circuit. Particularly preferred is a colloidal slurry containing water and $Mg(OH)_2$ particles. The particle composition in the colloidal slurry is in the range of about 1–10 wt % with a preferred range of about 1.5–3 wt %. The colloidal slurry may also contain an alkali hydroxide, such as KOH, NaOH, $NH_4OH$, or mixtures thereof, and additives, such as oxidizers, surfactants, and slurry stabilizers. The alkali hydroxide composition ranges from about 0.05 to 3M. Potassium ferricyanide is a preferred additive.

In the first and second methods, a polyurethane polishing pad with or without foam backing is preferred. Preferably, the solution provided for rinsing contains an acid that forms water soluble salts or a salt dissolved in water. The acid may be a volatile acid, which will evaporate, and the surface of the integrated circuit will not have to be rinsed as thoroughly as compared with rinsing with a non-volatile acid mixture. The preferred acid solutions contain $HNO_3$, HCl, $H_2O_2$, or mixtures thereof The preferred salts dissolved in water are $NH_4NO_3$, $NH_4Cl$, or mixtures thereof.

The surface of the integrated circuit provided in the first and second methods may be made of barrier material, or metal, such as TiN, Ti, Ta, TaN, TiW, W or mixtures thereof. The colloidal slurry is particularly preferred in metal and oxide chemical mechanical polishing. If the polishing in the polishing step is metal polishing, then the colloidal slurry preferably has a pH in the range of about 3–6. Alternatively, if the polishing in the polishing step is oxide polishing, then the colloidal slurry preferably has a pH in the range of about 9.5–12.5. The rate of removal during the polishing step is preferably about 2000–4000 Å/minute.

When the abrasive containing a magnesium compound is mixed with acid, unlike alumina, silica, and cerium, it dissolves. As a result, during polishing, residual particles of abrasive may be easily removed from the polishing implement by the acidic solution. By rinsing the polishing implement with the acidic solution, conditioning of the implement to remove residue may be substantially eliminated, thereby increasing the life of the polishing implement. Thus, there will be significantly less scratches and particle induced defects on the surface after chemical mechanical polishing.

The above steps may be repeated any number of times.

While the invention has been described with specificity, additional advantages and modifications will readily occur to those skilled in the art. Therefore, the invention in its broader aspects is not limited to the specific details shown and described herein. Accordingly, various modifications may be made without departing from the spirit or scope of the general inventive concept as defined by the appended claims and their equivalents.

What is claimed is:

1. A method for polishing a surface of an integrated circuit comprising:
   a. applying a colloidal slurry, having abrasive particles containing a magnesium compound, to said surface;
   b. polishing said surface with a polishing implement; and
   c. rinsing said surface with a solution that reacts with said magnesium compound to form a water soluble salt to remove said colloidal slurry and particles generated from said polishing.

2. The method of claim 1 further comprising the step of:
   d. rinsing said polishing implement with said solution to remove particles remaining on said polishing implement.

3. The method of claim 1 wherein said abrasive particles comprise a magnesium compound selected from the group consisting of MgO, $Mg(OH)_2$, $Mg_2(OH)_2CO_3$, and mixtures thereof.

4. The method of claim 1 wherein said solution comprises a compound selected from the group consisting of $HNO_3$, HCl, $H_2O_2$, $NH_4NO_3$, $NH_4Cl$, and mixtures thereof.

5. The method of claim 1 wherein said polishing implement is a polyurethane pad.

6. The method of claim 1 wherein said polishing implement is a polyurethane pad having foam backing.

7. The method of claim 1 wherein said surface comprises a barrier material.

8. The method of claim 7 wherein said barrier material comprises a material selected from the group consisting of TiN, Ti, Ta, TaN, TiW, W and mixtures thereof.

9. The method of claim 1 wherein said polishing removes said surface at a removal rate of about 2000–4000 Å/minute.

10. The method of claim 1 wherein said polishing is oxide polishing and said colloidal slurry has a pH of between about 9.5–12.5.

11. The method of claim 1 wherein said polishing is metal polishing and said colloidal slurry has a pH of between about 3–6.

12. The method of claim 1 wherein said colloidal slurry has an abrasive particle composition of about 1–10 wt %.

13. The method of claim 1 wherein said colloidal slurry has an abrasive particle composition of about 1.5–3 wt %.

14. The method of claim 1 wherein said colloidal slurry has an alkali hydroxide composition of about 0.05–3M.

15. An integrated circuit made by the method of claim 1.

\* \* \* \* \*